(12) United States Patent
Radhakrishnan et al.

(10) Patent No.: US 8,122,265 B2
(45) Date of Patent: Feb. 21, 2012

(54) POWER MANAGEMENT USING ADAPTIVE THERMAL THROTTLING

(75) Inventors: Sivakumar Radhakrishnan, Portland, OR (US); Suneeta Sah, Portland, OR (US); William H. Nale, Livermore, CA (US); Rami Naqib, Portland, OR (US); Howard S. David, Portland, OR (US); Rajat Agarwal, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1453 days.

(21) Appl. No.: 11/648,253

(22) Filed: Dec. 29, 2006

(65) Prior Publication Data

US 2008/0163226 A1  Jul. 3, 2008

(51) Int. Cl.
  *G06F 1/00* (2006.01)
(52) U.S. Cl. ......... 713/300; 713/320; 711/100; 711/154
(58) Field of Classification Search .................. 713/300, 713/320; 711/100, 154
  See application file for complete search history.

(56) References Cited

U.S. PATENT DOCUMENTS

| 6,470,238 | B1 | 10/2002 | Nizar et al. | |
|---|---|---|---|---|
| 6,662,278 | B1 * | 12/2003 | Kahn et al. | 711/154 |
| 6,772,352 | B1 * | 8/2004 | Williams et al. | 713/300 |
| 7,064,994 | B1 | 6/2006 | Wu | |
| 7,191,088 | B1 * | 3/2007 | Reed et al. | 702/130 |
| 7,260,007 | B2 * | 8/2007 | Jain et al. | 365/212 |
| 7,318,130 | B2 * | 1/2008 | Morrow et al. | 711/154 |
| 7,418,561 | B2 * | 8/2008 | Kahn et al. | 711/154 |
| 2004/0019738 | A1 * | 1/2004 | Kahn et al. | 711/104 |
| 2004/0193822 | A1 * | 9/2004 | Kareenahalli et al. | 711/167 |
| 2005/0068831 | A1 * | 3/2005 | Johnson | 365/222 |
| 2006/0179334 | A1 * | 8/2006 | Brittain et al. | 713/320 |
| 2006/0221741 | A1 * | 10/2006 | Jain et al. | 365/211 |
| 2008/0040562 | A1 * | 2/2008 | Gower et al. | 711/154 |
| 2008/0120485 | A1 * | 5/2008 | Rothman et al. | 711/165 |

OTHER PUBLICATIONS

"Dynamic Power Control of a Memory Device Thermal Sensor", U.S. Appl. No. 11/497,946, filed Aug. 1, 2006.

* cited by examiner

*Primary Examiner* — Thomas Lee
*Assistant Examiner* — Jaweed A Abbaszadeh
(74) *Attorney, Agent, or Firm* — Blakely, Sokoloff, Taylor & Zafman LLP

(57) ABSTRACT

In some embodiments, a chip includes a scheduler, transmitters, receivers, and control circuitry. The schedule schedules signals to be transmitted outside the chip and the transmitters transmit the scheduled signals outside the chip. The receivers receive signals including signals with temperature information related to a temperature outside the chip. The control circuitry selectively limit a number of commands that can be scheduled within a series of smaller windows while checking the temperature information near the conclusion of a larger window comprising many smaller windows. Other embodiments are described.

22 Claims, 8 Drawing Sheets

POWER MANAGEMENT USING ADAPTIVE THERMAL THROTTLING

BACKGROUND

1. Technical Field

Embodiments of the present inventions relate in general to throttling commands to integrated circuit chips.

2. Background Art

Semiconductor chips can malfunction if they get too hot. The temperature of a chip (also called a die) is related the number of operations of the chip performs per unit time. To keep chips from running too hot, the number of operations of the chips can be restricted either in response to an actual temperature measurement, or based on a predetermined number of operations. This is referred to as throttling. Some operations have much more power intensive than others. In some systems, throttling involves some commands such as read and write transactions ("reads" and "writes" or "activations") involving other chips, but not other commands such as sync pulses and refresh. In the case in which throttling involves an actual temperature measurement, if the measured temperature is above a particular amount, the number of transactions can be restricted until the temperature is below a particular amount, which may be lower than the temperature which triggered the throttling to prevent rapid switching between throttling and not throttling. In the case in which throttling involves a predetermined number of operations, the number of operations in a window of time is prevented from exceeding the predetermined number.

Memory systems have been used in these types of throttling. In particular, the memory controller reduces the number of read and write transactions or stops the transactions altogether for either the window of time or until the temperature is sufficiently reduced.

Various arrangements for memory chips in a memory system have been proposed. For example, in a traditional synchronous dynamic random access memory (DRAM) system, memory chips communicate data through bidirectional data buses and receive commands and addresses through command and addresses buses. The memory chips have stubs that connect to the buses. Other memory systems use unidirectional signaling. Some memory systems use a multi-drop signaling arrangement in which signals are transmitted to more than one receiver. Other memory systems use point-to-point signaling in which signals are transmitted to only one receiver.

A Fully-Buffered Dual In-Line Memory Module (FBD or FBDIMM) system includes a memory module having a buffer and memory chips on one or both sides of a substrate. In traditional DRAM systems, read and write commands and the read and write data are passed directly between the memory controller and the memory chips. By contrast, with an FBD system, read and write commands and the read and write data are passed between the memory controller and a buffer, and between a buffer and the memory chips. There is a narrow high speed channel between the memory controller and the buffer, and a more traditional bus between the buffer and the memory chips. However, narrow high speed interconnects between the buffer and memory chips has been proposed. There may be more than one memory module in series, with the buffer of one module communicating with the buffer of another module. There may also be more than one buffer on a module. Further, some systems have more than one parallel channel between the memory controller and different modules.

In FBD systems, command, address, and write data signals are provided in frames between the memory controller and the buffer and between the buffer and the memory chips. In the buffer, the frames are one clock period in duration with several parallel conductors. Read data is provided in the opposite direction from the memory chips to the buffer and from the buffer to the memory controller. In some FBD systems, a sync frame (or sync pulse) is provided by the memory controller to the buffer every 42 clock periods. In response to the sync frame, the buffer provides a status frame (or status pulse) which includes status bits.

Current memory controller traffic-throttling algorithms either do not turn off clock-enables while they are prohibiting memory transactions (desktops and servers), or they turn off clock-enables aggressively as a means of prohibiting memory transactions (mobile systems).

In some memory systems, a memory chip receives signals and repeats them to a next memory chip in a series of two or more memory chips. In some of these systems, the last memory chip in the series can send a signal directly back to a memory controller. This is referred to as a ring. In some such systems, a memory chip provides some read data signals while also providing commands to another memory chip which provides additional read data signals. Unidirectional lanes have been used to carry packetized command, address, and write data signals, along with clocks signals, between memory controllers and memory chips, and between memory chips. The signals carrying write data may be separate from the signals carrying command and address signals. Status bits may be carried with the read data.

In some memory systems, all the memory chips are on memory module substrates. In other memory systems, some of the chips may be "down" on the motherboard and other memory chips may be "up" on the memory module.

Power consumption, cost, delivered bandwidth, reliability, availability, and serviceability (RAS) are some of the issues to address on the chip systems in general, including FBD technology.

Some memory controllers are included in processor chips that include one or more processor cores. The processor chips are coupled to an input/output controller. Other memory controllers are included in memory controller hubs that are coupled to an input/output controller. In some memory systems, there are multiple concurrent channels between the chip including the memory controller and other portions of a computer system. In some implementations, the input/output controllers may be coupled to wireless transmitting and receiving circuitry.

BRIEF DESCRIPTION OF THE DRAWINGS

The inventions will be understood more fully from the detailed description given below and from the accompanying drawings of embodiments of the inventions which, however, should not be taken to limit the inventions to the specific embodiments described, but are for explanation and understanding only.

DETAILED DESCRIPTION

The inventions involve various closed and open loop throttling techniques. In some embodiments, these techniques involve a global window including many smaller windows during which a limited number of transactions may be performed. The smaller windows can be called thermal enforcement windows or thermal windows. Decisions regarding how many transactions may be performed in the thermal windows are made during one or more are of the global windows.

Some embodiments of the inventions may be used in a variety of chip systems, and some embodiments are specifically directed to fully-buffered DIMM (FBD) systems. The throttling may involve read and write transactions (reads and writes) between the memory controller and a buffer, which may communicated with another buffer. The thermal enforcement window is multiple FBD frames. In some embodiments, throttling is enforced by limiting the number of memory transactions that can be launched within the thermal enforcement window. When the traffic-throttling algorithm has determined that the traffic budget for a given FBD in the thermal enforcement window has been completely used, the memory controller may turns off the clock enable signals of the FBD in order to reduce power consumption. If there is not sufficient time remaining in the thermal enforcement window to warrant turning the clock-enable off (i.e. clock enable can not be turned off then on in the time remaining) then the clock enable is not turned off. Other embodiments may involve different details.

Figure 1:
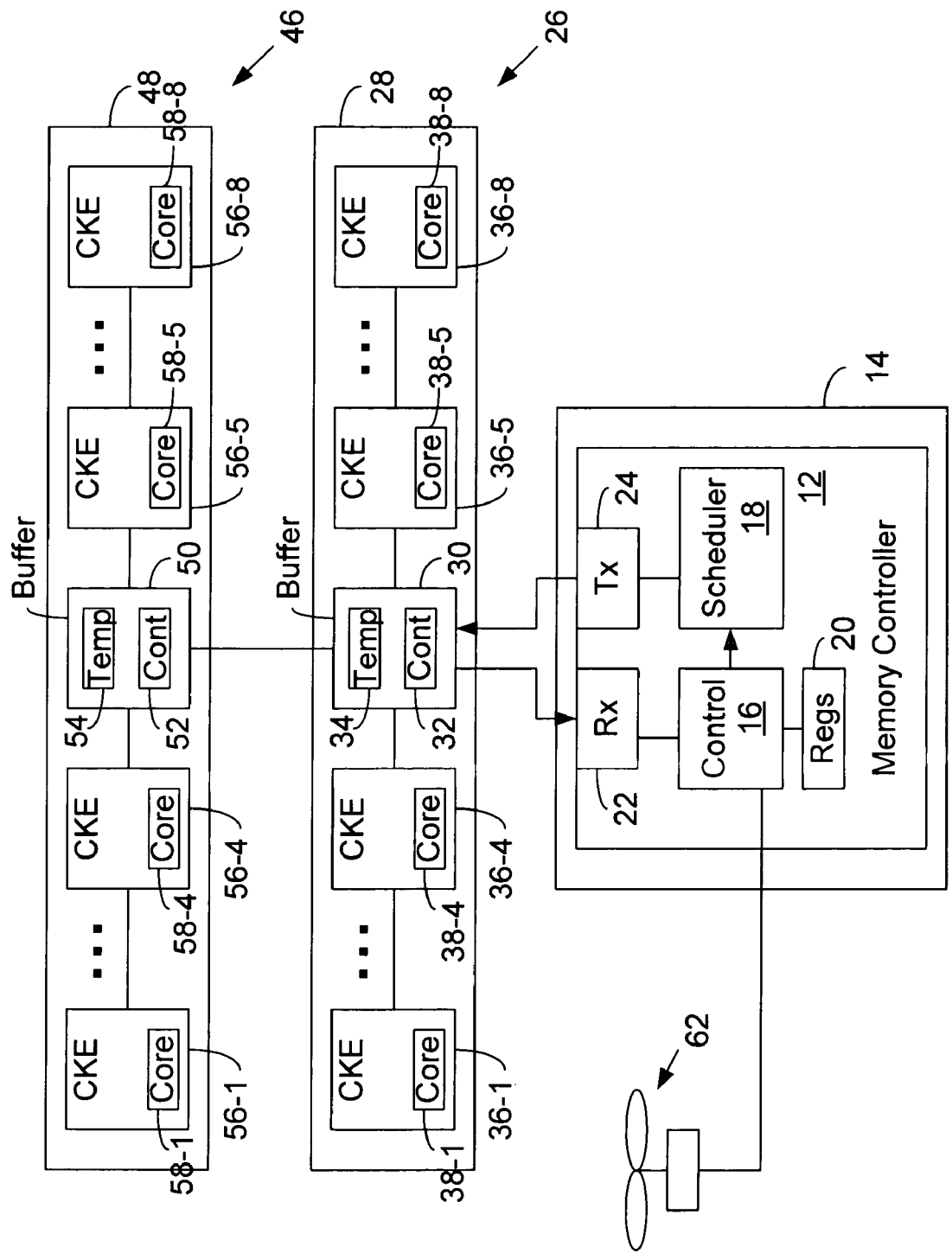
FIG. 1 is a block diagram representation of a system including a memory controller and Fully Buffered DIMM modules, according to some embodiments of the inventions.

Referring to FIG. 1, an FBD system includes a memory controller 12 in a chip 14. Chip 14 may be a processor chip with one or more processor cores or another chip such as a memory controller hub. Memory controller 12 includes control circuitry 16 that controls scheduler 18 in addition to other aspects of memory controller 12. Scheduler 18 schedules at least commands (including write commands), address, and write data signals in frames to be transmitted by transmitters 24 to buffer chip 30 on memory module 26. Memory module 26 includes buffer 30, and memory chips 36-1 . . . 364, 36-5 . . . 36-8 (including memory cores 58-1 . . . 58-4, 58-5 . . . 58-8) on a substrate 28. In some embodiments, the memory chips include clock enable (CKE) signals. Registers 20 holds certain bits to assist in throttling decisions are described below. There may be other memory chips and perhaps another buffer on the other side of substrate 28. FIG. 1 suggests there are eight memory chips on the shown side of substrate 28, but there may be more or less than eight memory chips.

Buffer 30 provides read data signals and also status information in frames to receivers 22 of memory controller 12. Buffer 30 on substrate 28 and buffer 40 on substrate 48 of memory module 46 communicate frames of command, address, and write data signals and read data and status signals with each other. Memory chips 56-1 . . . 56-4 and 56-5 . . . 56-8 (including memory cores 58-1 . . . 58-4 and 58-5 . . . 58-8) are also on substrate 48. There may be additional memory chips and perhaps another buffer on substrate 48.

Buffer 30 includes control circuitry 32 and buffer chip 50 includes control circuitry 52. In some embodiments, temperature sensors 34 and 54 are associated with buffers 30 and 50, although they are not included in other embodiments. Temperature sensors 34 and 54 may be inside buffers 30 and 50, or they may be inside or on top of a package (such as a ceramic package) that surrounds buffers 30 and 50. In embodiments that include temperature sensors 34 and 54, among other things, control circuitry 32 communicates temperature information to receivers 22. In some embodiments, the temperature information is included with status bits in status frames (or status pulses) that are provided in response to a sync frame (or sync pulse) that is provided by the memory controller every 42 frames. Note that a thermal window lasts for the time of 32 sync frames (32×42=1344 frames).

In some embodiments, control circuitry 16 (or other control circuitry in the system) can also control whether a fan(s) 62 is on. In some embodiments, control circuitry 16 can also control the speed of fan 62. However, in other embodiments, control circuitry 16 is not involved with operation of a fan such as fan 62.

In closed loop embodiments, control circuitry 16 uses the temperature information is determining what, if any, restrictions to place on the number of allowed read and write transactions during the thermal windows. Temperature information can be provided by temperature sensors 54 to control circuitry 52, which provides it through buffer 30 to receivers 22 of memory controller 12. In some embodiments, control circuitry 16 evaluates the temperatures of modules 26 and 46 independently and schedules to them separately based on the temperatures. In other embodiments, control circuitry 16 can treat them together based on the higher to the module temperatures. Other approaches could be used.

Figure 2:
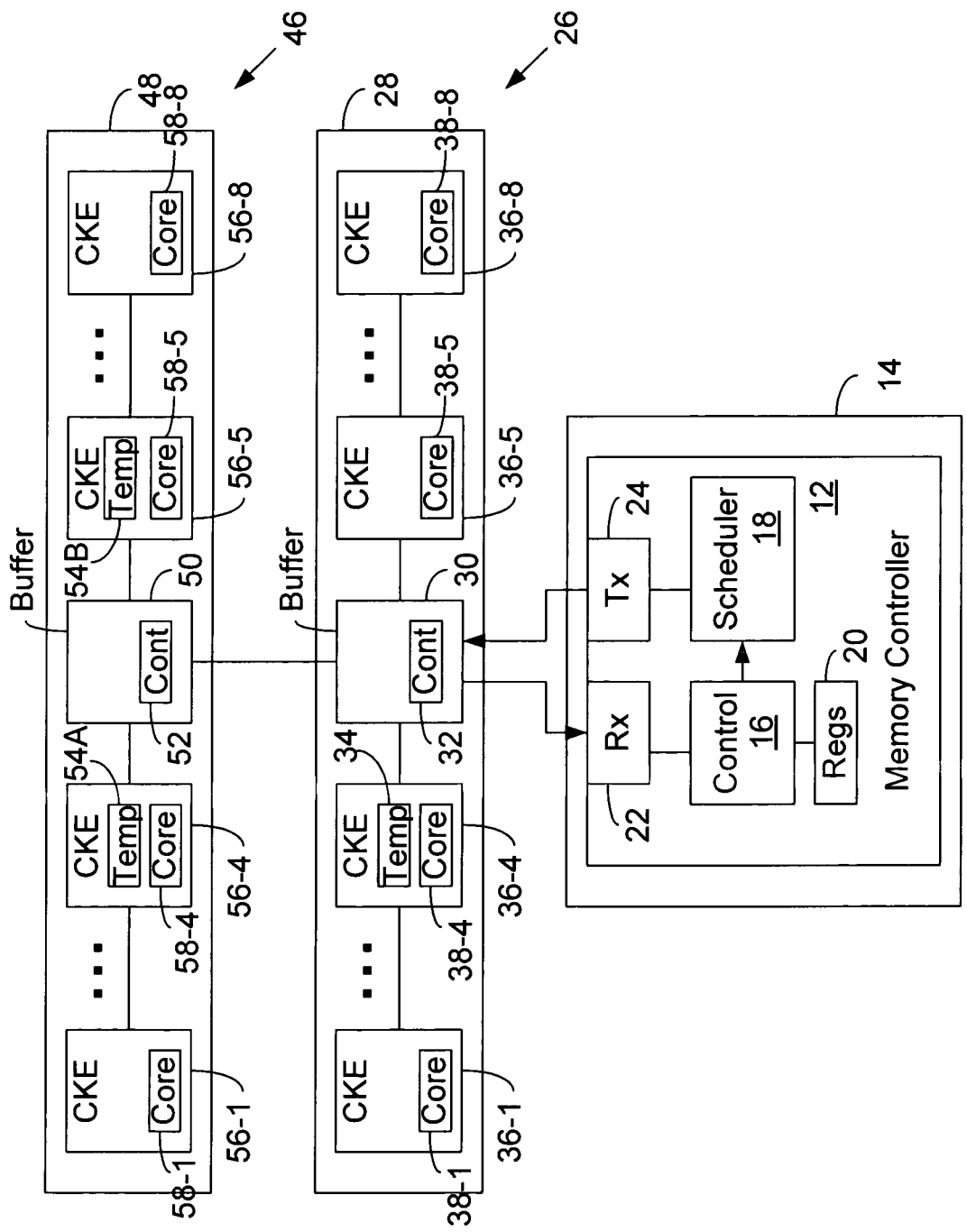
FIG. 2 is a block diagram representation of a system including a memory controller and Fully Buffered DIMM modules, according to some embodiments of the inventions.

It is not required that the temperature sensor be on or in buffer 30 and 50. For example, FIG. 2 shows the temperature sensor 34 being on or in memory chip 36-4, and temperature sensor 54A being on or in chip 56-4 and temperature sensor 54B being on or in chip 56-5. Buffer 50 could use the higher of the two sensors for temperature information. Other approaches could be used. The temperature sensors could be in other places, such as on the substrate.

The following describes some details of FBD throttling according to some embodiments. Other embodiments do not include some or all of these details.

1. FBD Throttling

In some embodiments, memory controller 12 implements an adaptive throttling methodology to limit the number of memory requests (reads or writes) to memory chips on modules 26 or 46. The throttling of activates may be in response to a closed loop scheme, an open loop scheme, or a combination of them. The methodology involves of closed/open loop throttling of activates on the FBD. In some embodiments, only open loop throttling techniques are used. In other embodiments, only closed loop throttling techniques are used. In still other embodiments, a combination of open loop and closed loop throttling techniques is used.

1.1 Closed Loop Thermal Activate Throttle Control

In the closed loop thermal activate throttling scheme, the temperature of the DIMMs is read by a thermal sensor located in the buffer chip or in or on the buffer package and is fed back to the memory controller. The memory controller uses this information to limit the number of activates to any DIMM within a thermal throttling window based on temperature threshold crossing algorithm described in the pseudo code section, below (thermal throttling activation algorithm). A thermal throttle window is a window consisting of 1,344 memory controller core cycles that is chosen as an integral multiple of the FBD sync frequency of 42 frames.

Every 42 FBD frames, the host controller sends a sync packet, which returns a status packet from a buffer. The memory controller will send a configuration write to the buffer to enable temperature sampling by the buffer. This temperature information is returned in the status packet. The buffer that interfaces the memory modules (DIMMs) and the memory controller has two temperature threshold points, Tlow (T1) and Tmid (T2), and the current temperature of the buffer with respect to these thresholds are returned in the status packet. In addition, the sync and status packets may guarantee that enough transitions occur on each lane to maintain proper bit lock for the electricals.

Figure 3:
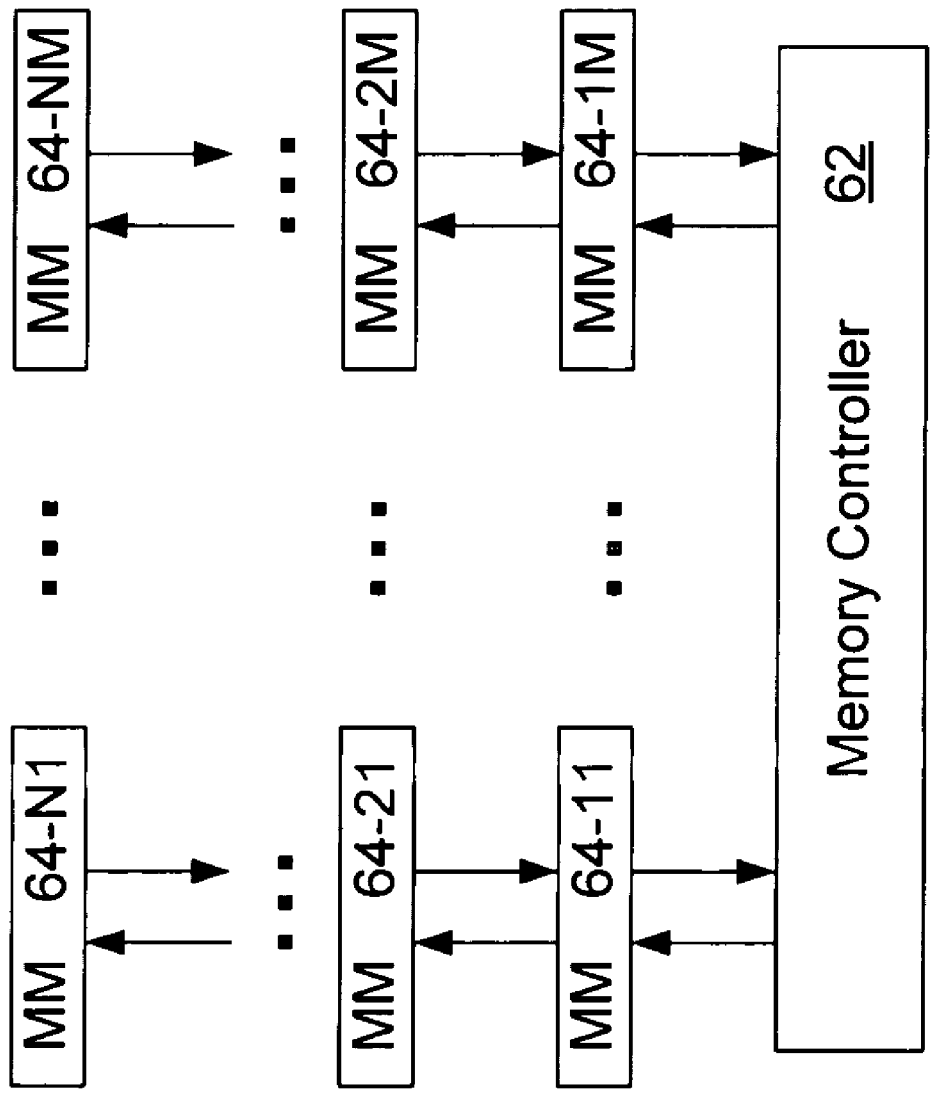
FIG. 3 is a block diagram representation of a system including a memory controller and multiple branches of memory modules on different channels according to some embodiments of the inventions.

FIG. 3 shows a system with a memory controller 62 (which can be the same as or different than memory controllers 12 and 112), and with M branches of N memory modules, where M and N can be the same or a different number.

Figure 4:
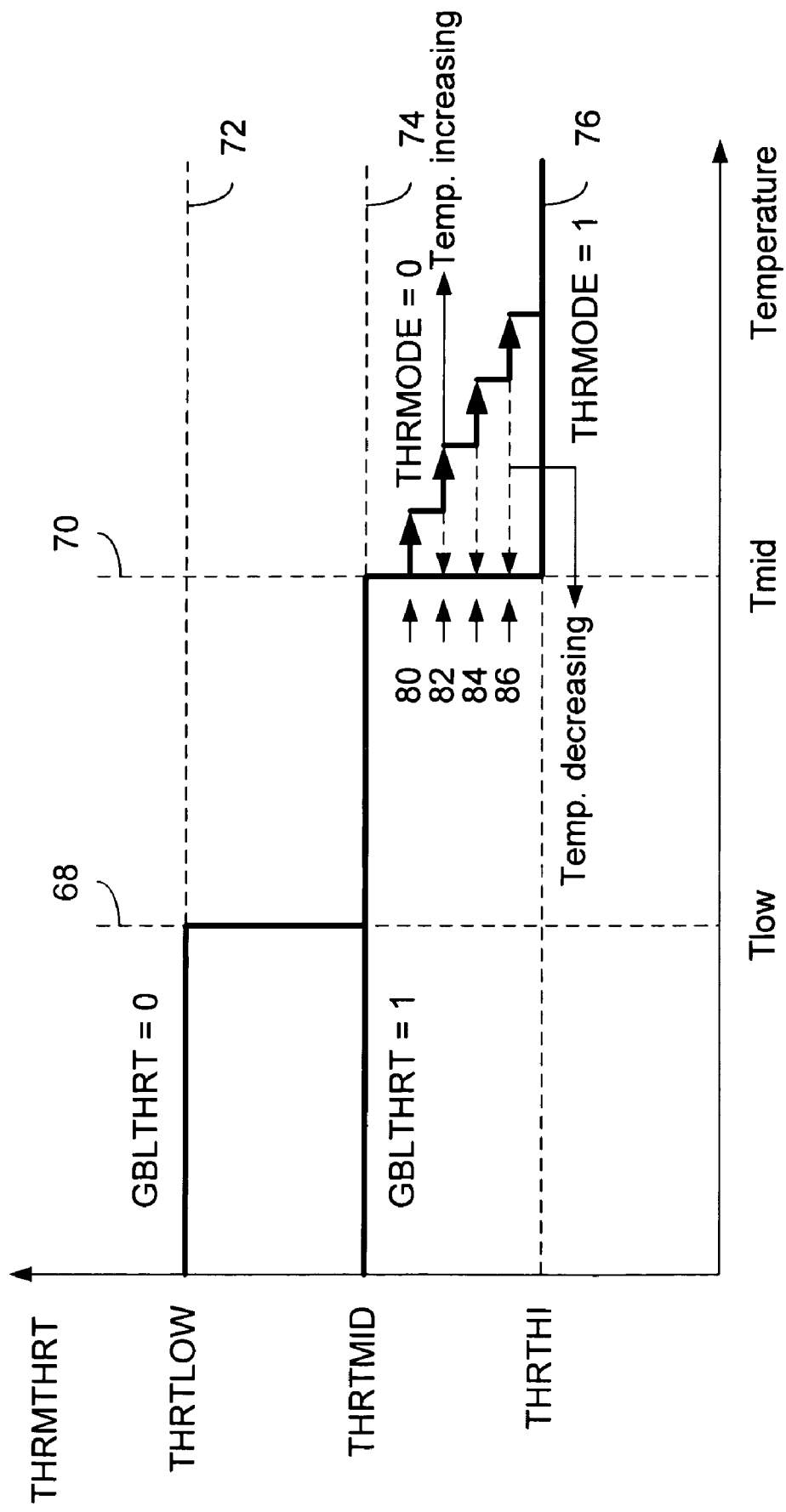
FIG. 4 is a graphical representation of thermal throttling v. temperature in an open loop system according to some embodiments of the inventions.
Figure 5:
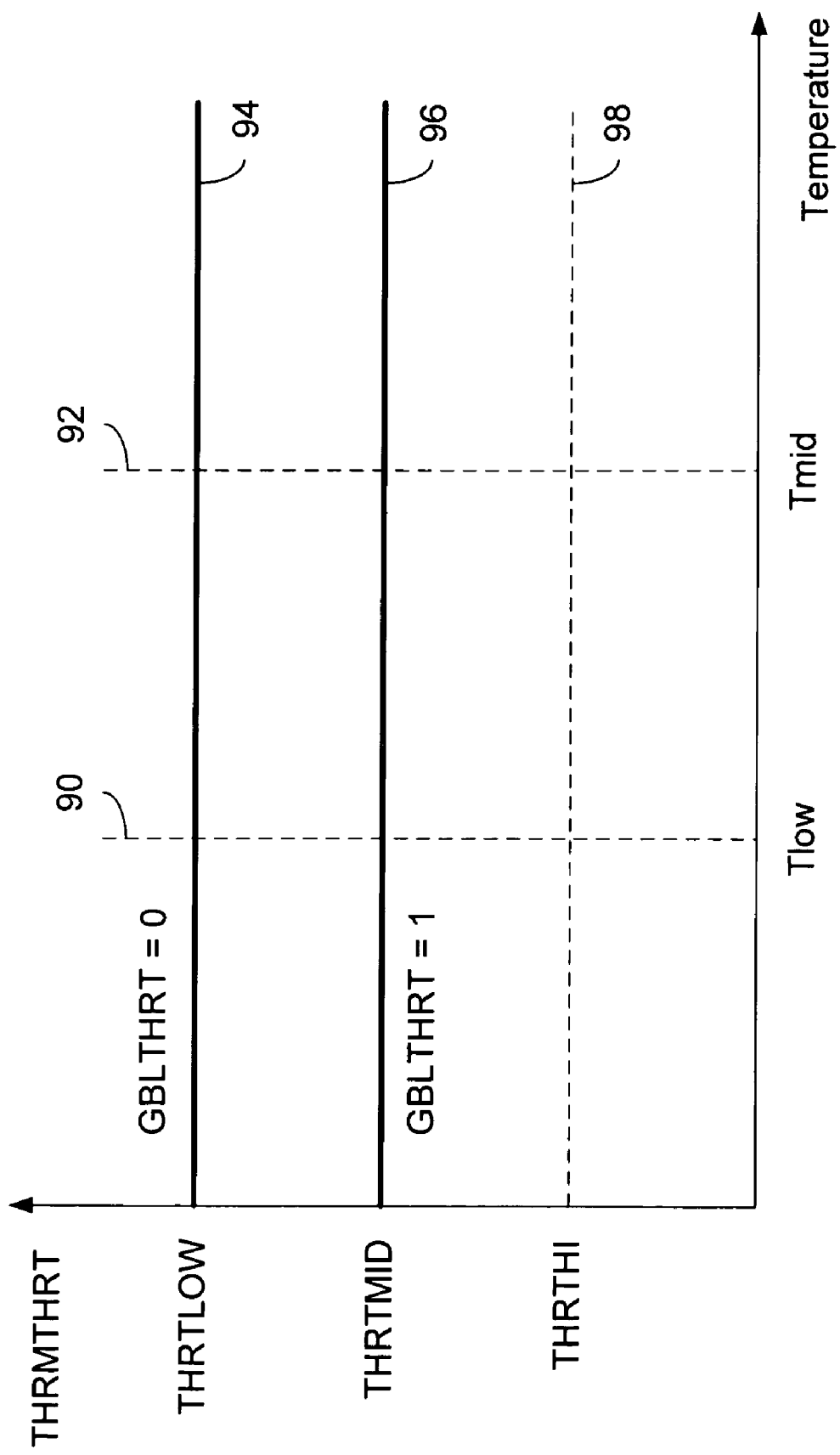
FIG. 5 is a graphical representation of thermal throttling v. temperature in a closed loop system according to some embodiments of the inventions.

FIG. 4 shows a thermal throttling level vs. temperature graph for the closed loop case (THRMHUNT=1) and FIG. 5 shows a thermal throttling level vs. temperature graph for the open loop case (THRMHUNT=0) (Thermal Throttling with THRMHUNT=0) for thermal envelopes. In FIG. 4, lines 68 and 70 represent the boundaries at temperatures Tlow and Tmid, and lines 72, 74, and 76 represents the throttling values of THRTLOW, THRTMID, and THRTHI. In some embodiments, the temperature information is conveyed in two status bits from buffer 30. As an example, status bits 00 indicate a temperature lower than Tlow, status bits 01 indicate a temperature between Tlow and Tmid, status bits 10 indicate a temperature above Tmid, but decreasing from the previous temperature sensed, and status bits 11 indicate a temperature above Tmid, and increasing from the previous temperature sensed. In some embodiments, the system stays in the throttling mode indicated by the status bits until the completion of at least one global window with different status bits near the end of the global window.

Reference numbers 80, 82, 84, and 86 in FIG. 4 indicate different allowed number of activations while the system is in the 10 or 11 mode. Successive status bits 11 cause the allowed number of activations during thermal windows to decrease with each global window that is associated with the status bits 11—for example, from level 82 to level 84. As an example, the amount by which they decrease may be 4 (by 1 in the register, see Table 1), or some other number. Status bits of 10 following a global window associated with status bits of 10 or 11 mean the temperature is above Tmid, but decreasing. In this case, the number of allowed activates stays the same as for the previous global window—for example, remain at level 84 for each of the thermal windows in the two global windows.

The following numbered sections of the disclosure provide details that are used in some embodiments. However, the details are not required. Indeed, in other embodiments, some of these details are not included.

1.1.1 Memory Controller Throttling Logic

There are separate counters associated with each of the 4 lockstep DIMM pairs in a given branch. When any of the counters reaches its limit for a given branch, the entire branch is throttled until the end of the throttle window. No new DRAM commands are issued to any of the DIMMs on the branch until the end of the throttle window. If an activate has been issued to a bank, the follow on read or write may be issued, including an additional page hit access if applicable, allowing the page to close.

1.1.2 Sequence of Actions During Throttling

When throttling begins during a given throttling window, the following actions take place:
Stop new DRAM commands
Wait "X" clocks for DRAM commands to complete /* "X" is the worst case delay as defined below*/
Assert clock enable (CKE) low
. . . /* Wait for throttling window to expire */
Just before end of activation throttle window (about 3 clocks before for the CKE setup): Assert CKE high Once the branch has been throttled, the memory controller sends a broadcast CKE per DIMM command to take the CKE low on all DIMMs of the branch. This command is sent after the proper time has elapsed since the DRAM commands so that the outstanding transfers complete properly on the DRAMs. When activation throttling starts, the CKE should not go low on the DRAMs until the last command has completed in the DRAMs. The worst case may be an activate immediately followed by a posted CAS. A fixed time from the last command is used by the memory controller corresponding to the worst case time delay (X) with a suitable guard band to protect any data loss.

The parameter X (micro-architecture dependent) delays the CKE throttling from taking effect as it waits for the transactions to complete or the refresh (TRFC parameter) to subside. During this time, CKE throttling is rendered ineffective. The above implementation does not preclude other optimizations that could be undertaken to minimize the delay factor X. In DIMM technologies such as DDR2 667 MHz (2 Gbit), the TRFC parameter may run as high as 195 ns which is higher than the round trip delay time for the memory data. This means that CKE throttling is less optimal when there are no refreshes scheduled. The memory controller could intelligently reduce the X value when there are no refreshes that are already scheduled or waiting to be dispatched. Hence the resultant gain is that CKE throttling can be asserted longer period improving the power savings.

During the time that CKE is low, no DRAM commands should be sent on the channel. However, in some embodiments, Non-DRAM commands such as Configuration register and SYNC commands are required to be sent during this period.

When the throttle window is about to expire, a CKE command is sent to take all CKEs high. This must be done at least 3 clocks before the first command.

If the throttling begins very close to the end of the window, then the assertion of CKE low command would be delayed beyond the end of the throttle window. To prevent this occurrence, the memory controller logic handles by not observing a throttle in the last clocks of the window, or ignoring the CKE low command.

1.1.3 Memory Control Registers

Registers 20 in FIG. 1 include a number of memory throttling related registers that are used for storing temperature threshold and other control/data for proper operation of the throttling schemes. These include the following:

THRTSTS: Holds status information. (The nomenclature to reference a subfield X which is part of a register A is denoted as "A.X".)

THRTLOW, THRTMID, THRTUI: Low, middle and high thresholds for comparing and adjusting the throttling schemes. Merely as examples, in FIG. 4, THRTLOW may be 168, which when multiplied by 4 is 672 maximum number of activates. THRTMID may be 100, which when multiplied by 4 is 400 maximum number of activates. THRTHI may be 50, which when multiplied by 4 is 200 maximum number of activates. The multiplication factor may be different than 4. The selected values in register 20 for THRTLOW, THRTMID, and THRTHI may be different than 168, 100, and 50.

THRMTHRT: Updated by the memory controller based on the closed loop algorithm and temperature feedback from a buffer as a function of the ranges defined in THRTLOW, THRMID, and THRHI registers MC: Memory controller register that incorporates knobs for controlling and enabling the throttling logic. For example, these could be controllable by software from a graphical user interface or otherwise.

MTR: Memory Technology Register for electrical throttling control and adjustment 1.1.4 Throttling Parameters for Activation Throttling The current throttling parameters for each branch are stored in the THRMTHRT register field. All activation throttling parameters in the THRMTHRT registers are 8-bits wide, and provide increments of 4 activations per throttle window (1344 clocks). Three levels of throttling limits are defined.

THRTLOW: A base throttling level that is applied when the temperature is in the low range (below Tlow) and the internal THRTSTS.GBLTHRT* bit is not set by the Global Throttling Window logic.

THRTMID: A mid level throttling level that is applied when the temperature is in the middle range (above Tlow but below Tmid) or the internal THRSTS.GBLTHRT* bit is set by the Global Throttling Window logic.

THRTHI: The highest level of throttling. When MC.THRMODE=1, this level is applied whenever the temperature is above Tmid. When MC.THRMODE=0, this level is the ceiling of the hunting algorithm of the closed loop throttling. The temperature being above Tmid has priority over the Global Throttling Window throttling (the higher throttling level takes precedence).

The MC.THRMHUNT bit must be enabled for the temperature to have any influence on the throttle parameters. If MC.THRMHUNT=0, only the GBLTHRT bit from the Global Throttle Window, when enabled can change the THRMTHRT register field.

1.1.5 Closed Loop Activation Throttling Policy

Individual DIMMs flag their thermal state in the FBD status return. When the THRTCTRL.THRMHUNT configuration bit is set, memory reads and writes (summed together) will be regulated on a per-DIMM-pair basis according to the following algorithm described in the pseudo code section below (thermal throttling activation algorithm). The memory controller employs two schemes to control thermal throttling when temperature crosses Tmid.

Staircase Conditioning [THRTCTRL.THRMODE=0]: This method is employed when THRTCTRL.THRMODE=0 and temperature crosses above Tmid. The THRMTHRT register is capped to THRTMID (starting point) and it uses a linearly increasing (less aggressive) throttling algorithm to reduce activations and balance performance and power envelope when temperature rises and falls around Tmid point. Once THRTMID is reached, if temperature increases further during the next global window, then THRMTHRT register will be adjusted by the equation THRMTHRT=MAX (THRMTHRT −2, THRTHI). This produces the staircase effect as shown in FIG. 4. If the temperature decreases subsequently but is still greater than Tmid, then the THRMTHRT will retain its last value. This provides some degree of hysteresis control to allow the DIMMs to cool further before THRMTHRT jumps back to a larger number (i.e. less throttling) at the junction when the temperature reached Tmid. Refer to the dotted line in FIG. 4. This scheme helps in reducing the thermal power by limiting the number of activates.

Step Conditioning (brute force) [THRTCTRL.THRMODE=1]: This method is employed when THRTCTRL.THRMODE=1 and temperature crosses Tmid. The THRMTHRT register is capped to THRTHI and it provides a greater degree of throttling by allowing fewer activates to the memory allowing the DIMM to cool down quicker but at the expense of performance. This can be used to control sudden temperature surges that move the envelope from below Tlow to above Tmid and then stays there for a long period.

The following is referred to as the "pseudo code section" which includes pseudo code for a thermal throttling activation algorithm. The pseudo code represents functions that may be used in some embodiments, but other embodiments do not include some details of the pseudo code.

Pseudo code section (thermal throttling activation algorithm)

```
THRMTHRT = THRTLOW (Initialize to base-level Activations)
if (Global_Timer expires)
{
  if (MC.GTW_MODE == 1)    // Choose window size based on mode setting
  {  Global_Timer = 4*1344      // Validation & Debug Mode
  }
  else
  {  Global_Timer = 0.65625*2^25 = 16384*1344
    // make global throttling window an integral multiple of the closed loop window
  }
  if (THRTCTRL.THRMHUNT == 1)
  {
    for (each DIMM-pair [m] on each branch [n])  /* m=0..3, n=0..1 */
    {  if (temperature of any DIMM[i] >= Tmid) /* 0 <= i <= 3 */
      {  if (THRTCTRL.THRMODE == 0)
        if (THRMTHRT > THRTMID)
        {  /* This will cap the start point to THRTMID if there is a */
            /*  spike in buffer temperature from Tlow to Tmid & beyond */
```

-continued

| Pseudo code section (thermal throttling activation algorithm) |
|---|
| ```
            /* Provides better throttling and control */
            THRMTHRT = THRTMID
        }
        else    /* Staircase roll down may happen for subsequent samplings */
        {  if (the temperature of any DIMM which is above Tmid, increased)
           {    THRMTHRT = max(THRMTHRT - 2, THRTHI)
           } /* Otherwise retain last THRMTHRT value */
        } /* end of THRMTHRT > THRTMID check */
    }
    else
    {    THRMTHRT = THRTHI
    } /* end of THRMODE==0 check */
  }
  else if ((temperature of any DIMM[i] >= Tlow[i])
          && (temperature of all DIMM's[i] < Tmid[i]))
  {   THRMTHRT = THRTMID
  }
  else if (temperature of all DIMM's[i] < Tlow[i])
  { if (GBLTHRT == 1)
    {    THRMTHRT = THRTMID
    }
    else
    {    THRMTHRT = THRTLOW
    }
  }
 }
}
else
{ if (GBLTHRT == 1)
  {    THRMTHRT = THRTMID
  }
  else
  {    THRMTHRT = THRTLOW
  }
 }
}
``` |

1.2 FBD Bandwidth Based on Closed Loop Throttling

Table 1 is provided next.

TABLE 1

(FBD Bandwidth as a function of Closed loop thermal throttling)

| THRT* Reg Value | Activates | % BW allowed | BW per DIMM GB/s | sys BW, 1 DIMM/ch | sys BW 2 DIMM/ch | sys BW 4 DIMM/ch |
|---|---|---|---|---|---|---|
| 0 | unlimited | | | | | |
| 1 | | 0.60% | 0.03 | 0.13 | 0.25 | 0.51 |
| 2 | 8 | 1.19% | 0.06 | 0.25 | 0.51 | 1.02 |
| 3 | 12 | 1.79% | 0.10 | 0.38 | 0.76 | 1.52 |
| 4 | 16 | 2.38% | 0.13 | 0.51 | 1.02 | 2.03 |
| 5 | 20 | 2.98% | 0.16 | 0.63 | 1.27 | 2.54 |
| 6 | 24 | 3.57% | 0.19 | 0.76 | 1.52 | 3.05 |
| 7 | 28 | 4.17% | 0.22 | 0.89 | 1.78 | 3.56 |
| 8 | 32 | 4.76% | 0.25 | 1.02 | 2.03 | 4.06 |
| 12 | 48 | 7.14% | 0.38 | 1.52 | 3.05 | 6.10 |
| 16 | 64 | 9.52% | 0.51 | 2.03 | 4.06 | 8.13 |
| 20 | 80 | 11.90% | 0.63 | 2.54 | 5.08 | 10.16 |
| 24 | 96 | 14.29% | 0.76 | 3.05 | 6.10 | 12.19 |
| 28 | 112 | 16.67% | 0.89 | 3.56 | 7.11 | 14.22 |
| 32 | 128 | 19.05% | 1.02 | 4.06 | 8.13 | 16.25 |
| 36 | 144 | 21.43% | 1.14 | 4.57 | 9.14 | 18.29 |
| 40 | 160 | 23.81% | 1.27 | 5.08 | 10.16 | 20.32 |
| 44 | 176 | 26.19% | 1.40 | 5.59 | 11.17 | |
| 48 | 192 | 28.57% | 1.52 | 6.10 | 12.19 | |
| 64 | 256 | 38.10% | 2.03 | 8.13 | 16.25 | |
| 72 | 288 | 42.86% | 2.29 | 9.14 | 18.29 | |
| 80 | 320 | 47.62% | 2.54 | 10.16 | 20.32 | |
| 96 | 384 | 57.14% | 3.05 | 12.19 | | |
| 128 | 512 | 76.19% | 4.06 | 16.25 | | |
| 144 | 576 | 85.71% | 4.57 | 18.29 | | |
| 160 | 640 | 95.24% | 5.08 | 20.32 | | |
| 168 | 672 | 100.00% | 5.33 | 21.33 | | |

In table 1, the THRT*Reg value column lists a value in a register that is multiplied by a number (which is 4 in table 1) to obtain the number of allowed activates. One reason to multiply the value in a register is to obtain the number of allowed activates is that it allows a larger number of activates with a relatively smaller number of register bits. A second reason is that the multiplication factor could be changed. In other embodiments, there is not multiplication factor. In still other embodiments, different levels have different multiplication factors. The % bandwidth (BW) column indicates what percent of the possible bandwidth is being utilized by activates if there are the maximum allowed activates in the particular row. For example, in the bottom row of table 1, when the register value is 168, there may be 672 activations (read or write transactions) during a small window of 1344 cycles. However, 672 is also the maximum number of activates in 1344 cycles, because it takes two cycles per activation. Accordingly, if the maximum allowed activates were used, there would be a 100.00% bandwidth utilization. In practice, there would not be 672 activates in 1344 cycles. In the row with 160 in the first column, there may be 640 activates in the small window, which gives 95.24% of the allowed bandwidth. Again, as a practical matter, there may be less than 640 activates even if 640 activates are allowed.

In Table 1, the "BW per DIMM GB/s" column indicates the maximum bandwidth with DDR 2 667 MHz memory chips in units of gigabits/sec (GB/s). The next column "sys BW, 1 DIMM/ch" is four times the "BW per DIMM GB/s" column in the case of four channels. The "BW, 2 DIMM/ch," and "sys BW, 4 DIMM/ch" columns have more DIMMs per channel. The last two columns do not extent to the bottom because the maximum bandwidth would be exceeded—so the same bandwidth would be repeated.

1.2.1 Open Loop Global Throttling

FIG. 5 shows a thermal throttling level vs. temperature graph for the open loop case (THRMHUNT=0) (Thermal Throttling with THRMHUNT=0) for thermal envelopes. In FIG. 5, dashed lines 90 and 92 represent boundaries of Tlow and Tmid temperatures. Lines 94 and 94 represent the THRTLOW (throttling low) and THRTMID (throttling mid) values which correspond to GBLTHRT=0 and GBLTHRT=1. In the some embodiments, THRTHI and line 98 do not play a part in open loop global throttling.

In the open loop global window throttling scheme, the number of activates per DIMM pair per branch is counted for a larger time period called the "Global Throttling window".

The Global throttling window is chosen as an integral multiple of the thermal throttling window of 1344 clocks for maintaining a simpler implementation. Under normal operating conditions, the Global Throttling Window is 0.65625*225 clocks in duration and this translates to 16384*1344 clocks (~66.06 milliseconds) for DDR2 667 MHz DRAMs. The global throttling window prevents short peaks in bandwidth from causing closed loop activation throttling when there has not been sufficient DRAM activity over a long period of time to warrant throttling. It is in effect a low pass filter on the closed loop activation throttling.

During this Global throttling window, the number of activates is counted for each DIMM pair per branch (and in some embodiments, 24-bit counters are required). If the number exceeds the number indicated by the GBLACT.GBLACTLM register, then the THRTSTS.GBLTHRT bit is set for the respective branch, causing the activation throttling logic to use the THRTMID register. The THRTSTS.GBLTHRT will remain active until 16 global throttling windows in a row have gone by without any DIMM exceeding the GBLACT.

At the end of the 16 global throttling windows, if no DIMM pair activates exceed the GBLACT.GBLACTLM value, then the MC indicates the end of the period by clearing the THRTSTS.GBLTHRT register field.

If part way through the count of 16 global throttling windows, the GBLACT.GBLACTLM is again exceeded within one Global Throttle Window, the counter gets reset and it will once again count 16 Global throttle windows throttling at the THRTMID level.

1.2.2 Global Activation Throttling Software Usage

In practice, the throttle settings for THRTMID are likely to be set by software such that the MC throttle logic will actually prevent the GBLACT limit from being exceeded and the result will often be that such that THRTLOW is used for a Global Throttle Window, at which time, the GBLACT.GBLACTLM is exceeded, causing the MC s to use a larger throttling viz. THRTMID for 16 global windows. During each of those global windows, GBLACT limit is not exceeded, because the throttling will prevent it from being exceeded. After 16 global throttling windows, it switches back to THRTLOW, and on the next global window GBLACT is again exceeded, causing another 16 windows. Hence, we can get a cumulative pattern of 16, 1, 16, 1 global throttling windows and this prevents excessive heat dissipation in the FBDs by prolonging the throttle period.

1.2.3 FBD Bandwidth Based on Open Loop Throttling

Table 2 is provided next.

TABLE 2

Global Activation Throttling BW allocation as a function of GBLACTLM for a 16384 * 1344 window

| GBLACT GBLACTLM | # of Activates | % BW allowed | BW per DIMM GB/s | sys BW, 1 DIMM/ch | sys BW 2 DIMM/ch | sys Bw 4 DIMM/ch |
|---|---|---|---|---|---|---|
| 0 | unlimited | | | | | |
| 1 | 65536 | 0.60% | 0.03 | 0.13 | 0.25 | 0.51 |
| 2 | 131072 | 1.19% | 0.06 | 0.25 | 0.51 | 1.02 |
| 3 | 196608 | 1.79% | 0.10 | 0.38 | 0.76 | 1.52 |
| 4 | 262144 | 2.38% | 0.13 | 0.51 | 1.02 | 2.03 |
| 5 | 327680 | 2.98% | 0.16 | 0.63 | 1.27 | 2.54 |
| 6 | 393216 | 3.57% | 0.19 | 0.76 | 1.52 | 3.05 |
| 7 | 458752 | 4.17% | 0.22 | 0.89 | 1.78 | 3.56 |
| 8 | 524288 | 4.76% | 0.25 | 1.02 | 2.03 | 4.06 |
| 12 | 786432 | 7.14% | 0.38 | 1.52 | 3.05 | 6.10 |
| 16 | 1048576 | 9.52% | 0.51 | 2.03 | 4.06 | 8.13 |
| 20 | 1310720 | 11.90% | 0.63 | 2.54 | 5.08 | 10.16 |
| 24 | 1572864 | 14.29% | 0.76 | 3.05 | 6.10 | 12.19 |
| 28 | 1835008 | 16.67% | 0.89 | 3.56 | 7.11 | 14.22 |
| 32 | 2097152 | 19.05% | 1.02 | 4.06 | 8.13 | 16.25 |

TABLE 2-continued

Global Activation Throttling BW allocation as a function of GBLACTLM for a 16384 * 1344 window

| GBLACT GBLACTLM | # of Activates | % BW allowed | BW per DIMM GB/s | sys BW, 1 DIMM/ch | sys BW 2 DIMM/ch | sys Bw 4 DIMM/ch |
|---|---|---|---|---|---|---|
| 36 | 2359296 | 21.43% | 1.14 | 4.57 | 9.14 | 18.29 |
| 40 | 2621440 | 23.81% | 1.27 | 5.08 | 10.16 | 20.32 |
| 44 | 2883584 | 26.19% | 1.40 | 5.59 | 11.17 | |
| 48 | 3145728 | 28.57% | 1.52 | 6.10 | 12.19 | |
| 64 | 4194304 | 38.10% | 2.03 | 8.13 | 16.25 | |
| 72 | 4718592 | 42.86% | 2.29 | 9.14 | 18.29 | |
| 80 | 5242880 | 47.62% | 2.54 | 10.16 | 20.32 | |
| 96 | 6291456 | 57.14% | 3.05 | 12.19 | | |
| 128 | 8388608 | 76.19% | 4.06 | 16.25 | | |
| 144 | 9437184 | 85.71% | 4.57 | 18.29 | | |
| 160 | 10485760 | 95.24% | 5.08 | 20.32 | | |
| 168 | 11010048 | 100.00% | 5.33 | 21.33 | | |

In table 2, the GBLACT.GBLACTLM column lists a value in a register that is multiplied by a number (which is 65536 in table 2) to obtain the number of allowed activates. As with Table 1, as a practical matter, in the higher register values, it is unlikely that the maximum allowed activates would achieved.

Figure 6:
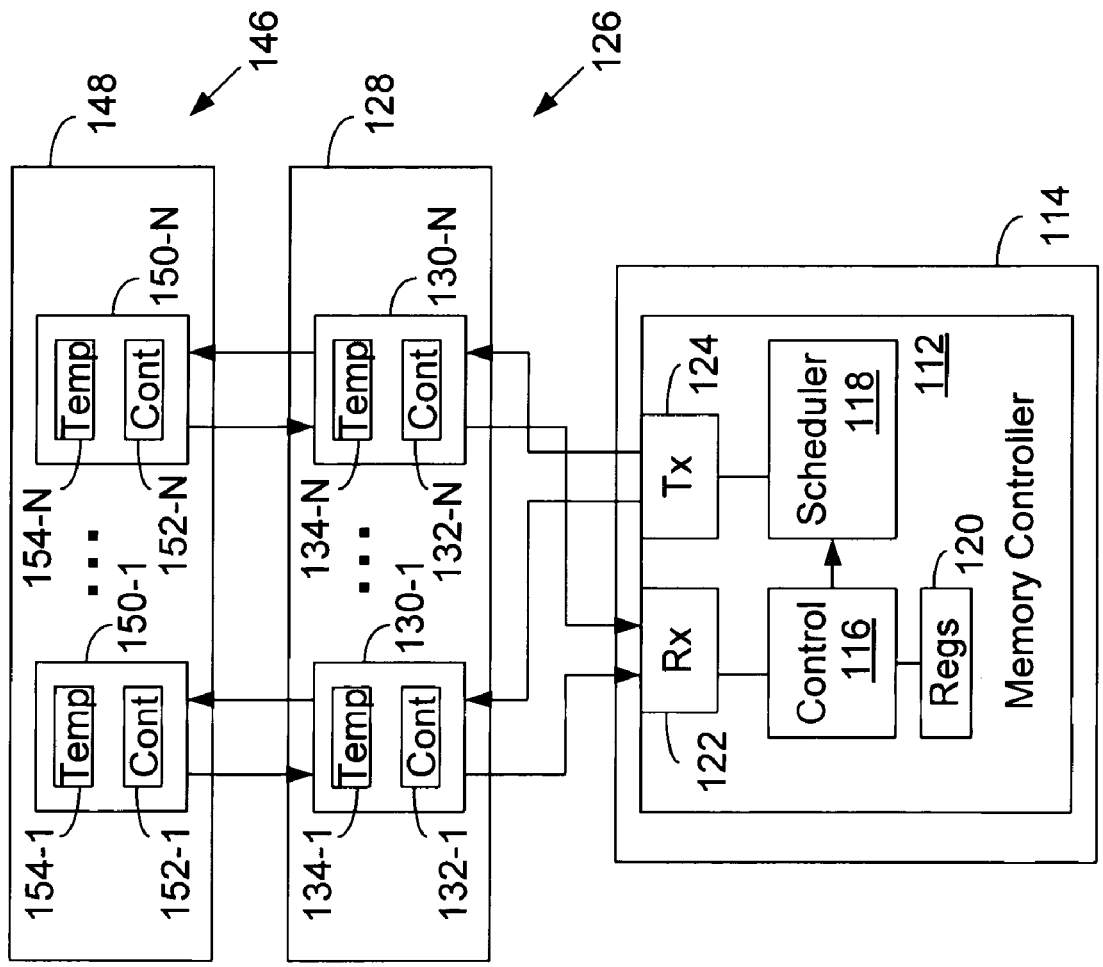
FIG. 6 is a block diagram representation of a system including a memory controller and memory modules, according to some embodiments of the inventions.

FIG. 6 illustrates a system without buffer chips on the modules. Memory controller 112 in chip 114 provides command, address, and write data signals to chips 130-1 ... 130-N through transmitters 124 and receives read data and temperature signals from chips 130-1 ... 130-N through receivers 122. Controller 116 decides what, if any, activation throttling to do through scheduler 118. Memory chips 130-1 ... 130-N include control circuitry 132-1 ... 132-N. In some embodiments, control circuitry 132-1 ... 132-N provides temperature information from associated temperature sensors 134-1 ... 134-N to receivers 122 and control circuitry 116. Memory chips 130-1 ... 130-N are on a substrate 128 of a memory module 126. A memory module 146 has memory chips 150-1 ... 150-N on a substrate 148 which may be coupled directly to receivers 122 and transmitters 124, or coupled to memory chips 130-1 ... 130-N, respectively. Memory chips 150-1 ... 150-N include control circuitry 132-1 ... 132-N. In some embodiments, control circuitry 132-1 ... 132-N provide temperature information from associated temperature sensors 154-1 ... 154-N to receivers 122 and control circuitry 116, directly or indirectly through chips 130-1 ... 130-N. Registers 120 holds certain bits to assist in throttling decisions are described herein. CKE enable signals may be included in the memory chips. Control circuitry 116 may control a fan(s), but that is not required.

Figure 7:
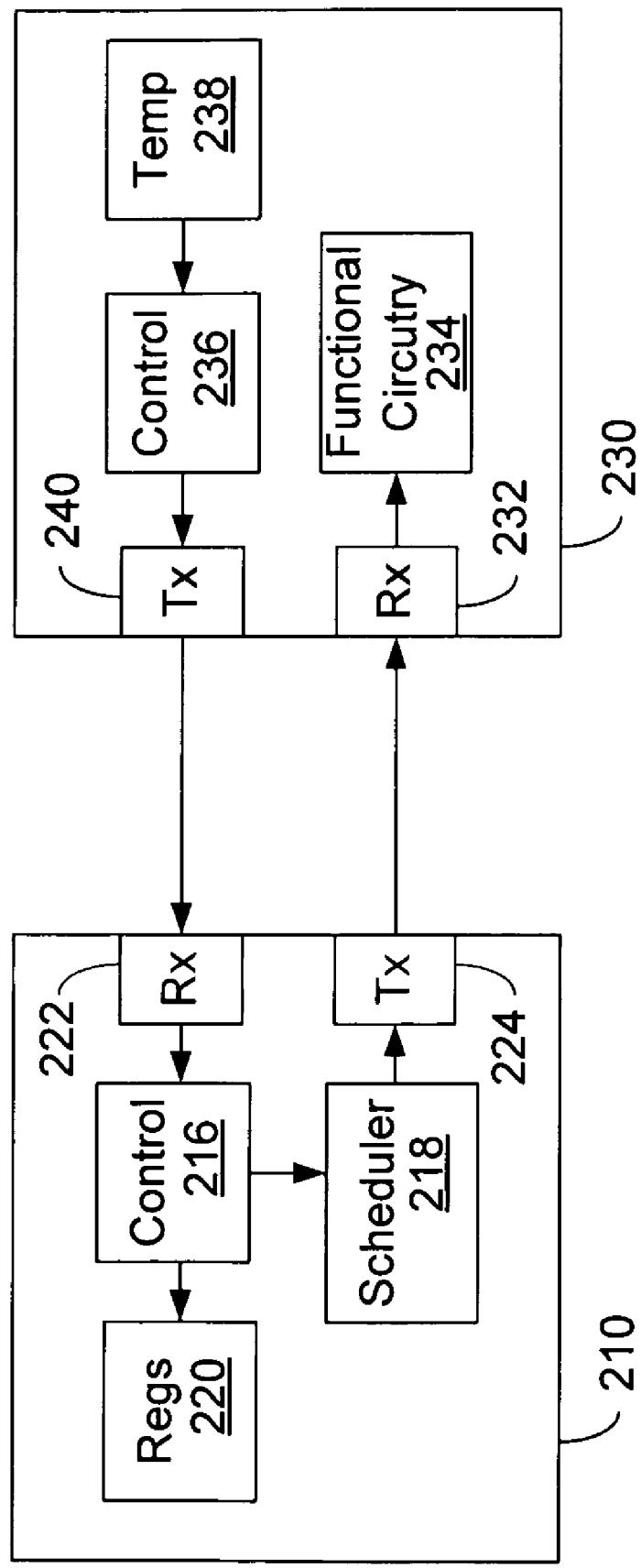
FIG. 7 is a block diagram representation of a system including two chips according to some embodiments of the invention.

The invention is not restricted to use with memory systems. For example, FIG. 7 shows a chip 210 with a scheduler 218 that provides commands and other signals to transmitters 224 to be transmitted to receivers 232 of a chip 230. Functional circuitry 234 responds to the commands and to other signals. In some embodiments, chip 230 is associated with a temperature sensor 238 that provide temperature signals to control circuitry 236 which provides temperature information in signals through transmitters 240 to receivers 222 of chip 210. Control circuitry 216 receives the signals with the control information and decides what, if any, throttling to do of signals provided by scheduler 218 in a similar manner to those described above. Registers 220 hold bits to assist in throttling as described herein.

Figure 9:
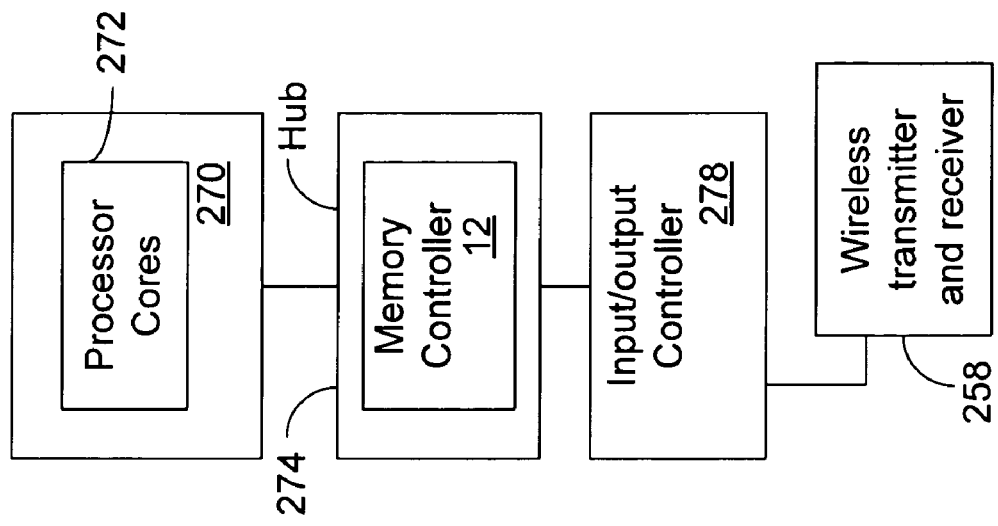
FIG. 9 is a block diagram representation of a system including a chip with processor cores, a chip with a memory controller, an input/output controller chip, and wireless transmitter and receiver circuitry according to some embodiments of the inventions.
Figure 8:
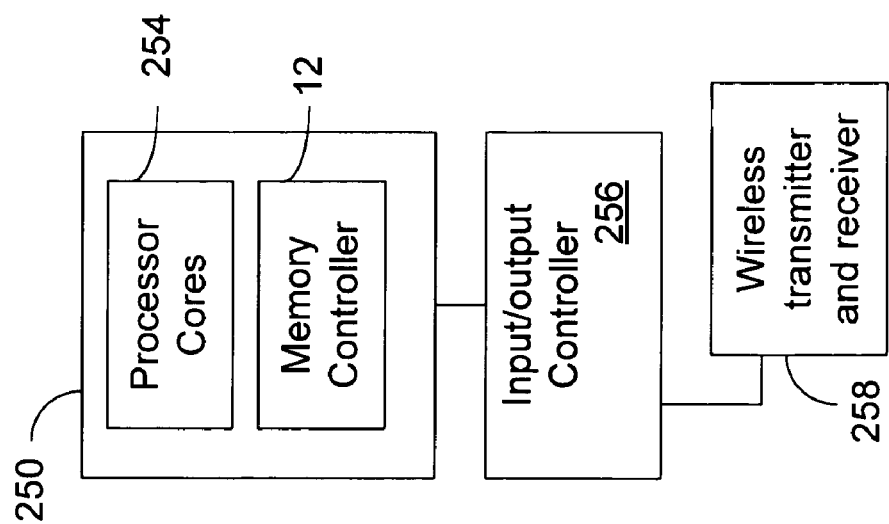
FIG. 8 is a block diagram representation of a system including a chip with processor cores and a memory controller, an input/output controller chip, and wireless transmitter and receiver circuitry according to some embodiments of the inventions.

FIGS. 8 and 9 illustrate that memory controller 12 can be in different chips. For example, in FIG. 8, memory controller 12 is part of a processor chip 250 that includes processor cores 254. Processor chip 250 is coupled to an input/output controller 256 which is coupled to wireless transmitter and receiver circuitry 258. In FIG. 9, memory controller 12 is part of a hub chip 274 which is coupled between a processor chip 270 that includes processor cores 272 and an input/output controller 278. Input/output controller 278 is coupled to wireless transmitter and receiver circuitry 258.

Other Information and Embodiments

The following are some additional details that relate to some embodiments but not to other embodiments.

Some embodiments involve managing DRAM device clock enables in order to reduce power consumption while traffic is being throttled due to thermal considerations, improving throttling efficiency. This allows the clock enable throttling to be non-invasive (the clock enables are never off when we would otherwise be scheduling traffic), which means there is no impact to memory read latency due to clock enable throttling—although in some embodiments this may not be the case. With an FBD topology, management of per-DIMM clock-enables may be possible without issues related to commercially available double data rate 2 (DDR2) DRAM ODT (on-die termination).

Situations such as thermal virus or fan fail down condition might warrant the BIOS/software (SW) to take preemptive action in adjusting the throttling to say 40-70% of the normal mode before it is cleared. This means that changes to throttling registers can happen at random intervals (infrequent) and the platform should be able to tolerate any transients changes that may result when the memory controller is updated with the new throttle values.

In some embodiments, the open and closed loop throttling scheme can by manipulated by basic input/output system (BIOS) or other devices such as Baseboard Management Controller (BMC) to implement algorithms for thermal management and dynamically change the throttle levels.

The following examples are some of the potential areas of this usage model where dynamic change may be used to balance performance and acoustic levels in the system.

Fan control for CPU temperature related system acoustics or other BMC related operations Limit hacker activity by increasing memory throttling via throttle register updates to condition the system based on some event (excessive bandwidth or CPU activity)

Fan failure/breakdown. When this occurs, temperature conditioning can be provided by reducing the activity level in the DIMMs to a certain threshold until the failed fan can be repaired by the technician and service restored to normalcy.

In some embodiments, a system includes a buffer and related down memory chips on the motherboard, wherein the buffer interfaces with the down memory chips, and another buffer on the memory module, wherein the other buffer interfaces with the up memory chips.

The chip interface balls used and the arrangement of the conductors may be such as to avoid crossing conductors between chips.

The conductors mentioned herein do not have to be of continuous material. For example, they may include vias or other connection structures.

The inventions are not restricted to any particular signaling techniques or protocols. For example, the signaling may be single ended or differential. The signaling may include only two voltage levels or more than two voltage levels. The signaling may be single data rate, double data rate, quad data rate, or octal data, etc. The signaling may involve encoded symbols and/or packetized signals. A clock (or strobe) signal may be transmitted separately from the other signals or embedded in the other signals. Various coding techniques may be used. Strobe signals could be used rather than clock signals. Write buffers may be included in the memory chips. The write data signals do not have to be on the same conductor lanes as the address and command signals.

The figures are shown and described with unidirectional point-to-point signaling. However, some embodiments may include bi-directional signaling on some conductors and include some multi-drop rather than point-to-point conductors.

There may be intermediate structure between the memory controller chip, memory chips, and connector and the motherboard. The various chips described or illustrated herein may have additional inputs or outputs which are not illustrated or described. In actual implementations of the systems of the figures, there would be additional circuitry, control lines, and perhaps interconnects which are not illustrated. When the figures show two blocks connected through conductors, there may be intermediate circuitry that is not illustrated. The shape and relative sizes of the blocks is not intended to relate to actual shapes and relative sizes.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments.

When it is said the element "A" is coupled to element "B," element A may be directly coupled to element B or be indirectly coupled through, for example, element C.

When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B."

If the specification states a component, feature, structure, process, or characteristic "may", "might", or "could" be included, that particular component, feature, structure, process, or characteristic is not required to be included. If the specification or claim refers to "a" or "an" element, that does not mean there is only one of the element.

The inventions are not restricted to the particular details described herein. Indeed, many other variations of the foregoing description and drawings may be made within the scope of the present inventions. Accordingly, it is the following claims including any amendments thereto that define the scope of the inventions.

What is claimed is:

1. A chip comprising:
a scheduler to schedule signals to be transmitted outside the chip to a fully buffered dual inline memory module (FBD) system;
transmitters to transmit the scheduled signals outside the chip;
receivers to receive signals including signals with temperature information related to a temperature outside the chip; and
control circuitry to selectively limit a number of commands that can be scheduled within a series of smaller windows while checking the temperature information near the conclusion of a larger window comprising many smaller windows.

2. The chip of claim 1, wherein in a particular temperature range, the number of allowed commands decreases with each larger window if the temperature is increasing and stays the same if the temperature is decreasing.

3. The chip of claim 1, wherein the smaller windows include 1344 cycles and the larger windows include 16834 of the smaller windows.

4. The chip of claim 1, wherein the allowed commands are read and write commands and wherein there are additional commands the number of which is not impacted by the limiting of the allowed commands.

5. The chip of claim 1, further comprising registers to hold different values to represent different numbers of maximum allowed commands, and wherein the control circuitry selectively throttles the scheduler responsive to a selected register value.

6. The chip of claim 5, wherein the values in the registers are multiplied by a number to obtain the number of maximum allowed commands.

7. The chip of claim 6, wherein there are different throttling levels, and the values associated with the different levels can be changed by selecting the values from different registers.

8. The chip of claim 6, wherein there are different throttling levels, and the values associated with the different levels can be changed by changing the values in the registers.

9. The chip of claim 8, wherein at least some of the changes in the values of the registers are made after the chip is in an ordinary operating mode.

10. The chip of claim 1, wherein additional commands are provided disable clock enable (CKE) signals when certain of the throttling levels are to be used.

11. A chip comprising:
a scheduler to schedule signals to be transmitted outside the chip to a fully buffered dual inline memory module (FBD) system;
transmitters to transmit the scheduled signals outside the chip;
registers to hold different values to represent different numbers of maximum allowed commands; and
control circuitry to selectively throttle the scheduler responsive to a selected register value, wherein the register value that is selected depends on a history of whether the number of commands has exceeded the allowed amount in prior windows of time.

12. The chip of claim 11, wherein the values in the registers are multiplied by a number to obtain the number of maximum allowed commands.

13. The chip of claim 11, wherein the commands are read and write commands and there are additional commands the number of which is not impacted by the throttling.

14. The chip of claim 11, wherein there is a lower throttling level and a higher throttling level, but the values associated with the lower and higher level can be changed by selecting the values from different registers.

15. The chip of claim 11, wherein there is a lower throttling level and a higher throttling level, but the values associated with the lower and higher level can be changed by changing at least some of the values in the registers.

16. The chip of claim 15, wherein at least some of the changes in the values of the registers are made after the chip is in an ordinary operating mode.

17. The chip of claim 11, further comprising receivers to receive signals include signals with temperature information related to a temperature outside the chip; and wherein the control circuitry has a further mode to selectively limit a number of the commands that can be scheduled within a series of smaller windows while checking the temperature information near the conclusion of a larger window comprising many smaller windows.

18. A system comprising:
a temperature sensor;
a first chip circuitry to provide signals including temperature information related to a value of the temperature sensors;
a second chip including:
a scheduler to schedule signals to be transmitted outside the chip to a fully buffered dual inline memory module (FBD) system;
transmitters to transmit the scheduled signals outside the chip;
receivers to receive the signals including the temperature information; and
control circuitry to selectively limit a number of commands that can be scheduled within a series of smaller windows while checking the temperature information near the conclusion of a larger window comprising many smaller windows.

19. The system of claim 18, wherein the temperature sensor is inside the first chip.

20. The system of claim 18, further comprising registers to hold different values to represent different numbers of maximum allowed commands, and wherein the control circuitry selectively throttles the scheduler responsive to a selected register value.

21. The system of claim 18, wherein there are different throttling levels, and the values associated with the different levels can be changed by selecting the values from different registers.

22. The system of claim 18, wherein there are different throttling levels, and the values associated with the different levels can be changed by changing the values in the registers.

* * * * *

UNITED STATES PATENT AND TRADEMARK OFFICE
CERTIFICATE OF CORRECTION

PATENT NO. : 8,122,265 B2
APPLICATION NO. : 11/648253
DATED : February 21, 2012
INVENTOR(S) : Radhakrishnan et al.

Page 1 of 1

It is certified that error appears in the above-identified patent and that said Letters Patent is hereby corrected as shown below:

In the Specification

In column 7, at line 4 delete, "THRTUI" and insert -- THRTHI --.

Signed and Sealed this
Twenty-first Day of October, 2014

Michelle K. Lee
*Deputy Director of the United States Patent and Trademark Office*